Jan. 5, 1960

L. L. SNYDER 2,920,159

BACKFLOW PREVENTION AND ALARM DEVICE

Filed Dec. 3, 1956

LEONARD L. SNYDER,
INVENTOR.

BY Lyon+Lyon

ATTORNEYS

United States Patent Office 2,920,159
Patented Jan. 5, 1960

2,920,159

BACKFLOW PREVENTION AND ALARM DEVICE

Leonard L. Snyder, Los Angeles, Calif., assignor to Backflow Engineering & Equipment Co., a copartnership Application December 3, 1956, Serial No. 625,707

2 Claims. (Cl. 200—81.9)

This invention relates to apparatus for preventing backflow from a consumers line to a supply line and is particularly directed to an improved device of this type for indicating leakage in a check valve or for indicating the presence of backflow conditions. This invention relates to improvements over the apparatus disclosed in my copending application, Serial No. 322,327, filed November 24, 1952, now Patent No. 2,773,251, issued December 4, 1956.

It is an important object of my invention to provide an improved alarm device which will signal when a check valve in a line is leaking or when backflow conditions are imminent.

It is a further object of this invention to provide a novel form of device for energizing an alarm circuit whenever the pressure downstream from the check valve approaches the pressure in the supply line within predetermined limits, whether this is occasioned by reduction of pressure in the supply line or increase in pressure in the consumers line, or both.

Another object is to provide such a device which will actuate a cut-off valve upstream from the check valve or a vent valve downstream from the check valve. Other and related objects will appear hereinafter.

Figure 1:
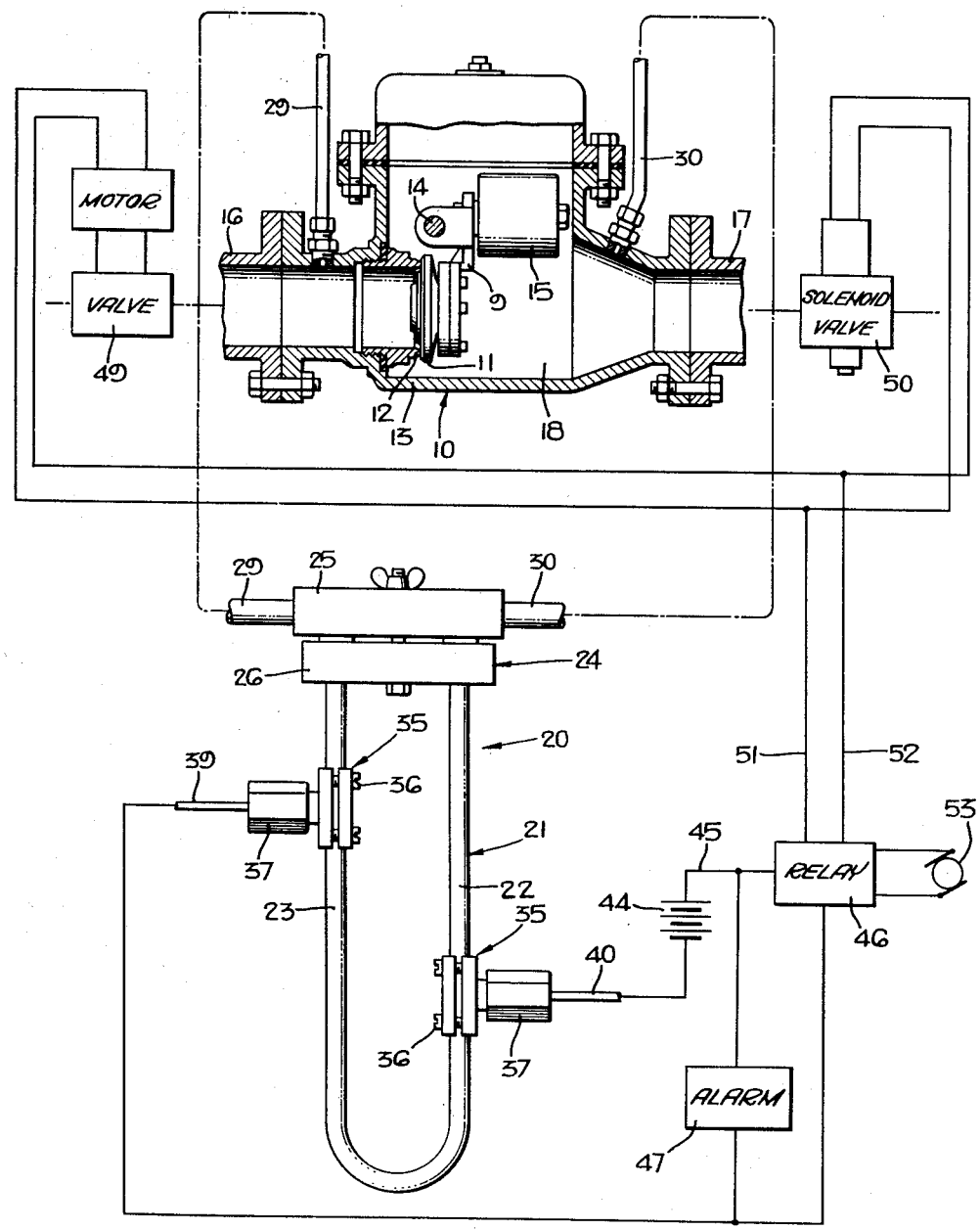
Figure 1 is a schematic diagram partly in section, showing a preferred embodiment of my invention.

Referring to the drawings, the check valve 10 may conveniently take the form shown in my copending application Serial No. 253,481, filed October 27, 1951, and now abandoned, entitled Backflow Preventer. In this device, a swinging valve element 11 is positioned in the line of flow and is adapted to engage a stationary seat 12. The valve element is carried on a swinging arm 9 within the housing 13. The arm is pivotally connected to the housing by means of the pivot shaft 14. A weight 15 is provided to hold the valve element 11 in sealing engagement with the seat 12 under no-flow conditions. The weight 15 has the further function of maintaining the valve element 11 in the line of flow so that a pressure differential exists between the supply conduit or line 16 and the service conduit or line 17 wherever liquid is flowing through the check valve 10 or at cessation of flow. In a particular commercial embodiment of the check valve 10, the pressure loss in the liquid flowing through the check valve is at least 2 p.s.i. In other words, the valve element 11 should seal against the seat 12 under no-flow conditions if the pressure in the supply line 16 is 60 p.s.i. and the pressure in the consumers line is 58 p.s.i. If the check valve should be faulty, however, and fail to provide a tight seal, liquid will flow from the supply line 16 to the consumers line 17. Under no-flow conditions this will cause a pressure rise within the consumers line 17 and within the chamber 18 within the housing 13. I make use of this pressure rise to energize an alarm circuit, as described below.

The differential pressure switch device, generally designated 20, includes a U-shaped mercury manometer tube 21 having parallel legs 22 and 23. The tube may be formed of glass or other suitable material which is electrically non-conducting. The tube is mounted on a bracket assembly 24 including a base 25 and a clamp plate 26. Packing 27 seals the legs of the tube to the base 25 and resilient tubular elements 28 form a seal between the interior of the legs of the tube and the base 25. A pipe 29 communicates via element 28 with the leg 23 of the tube 21, and pipe 30 communicates via the other element 28 with the leg 22 of the pipe 21. Pipe 29 is connected to the supply conduit 16 upstream from the valve 11 and the pipe 30 is connected to the housing to reflect pressures in the consumers line downstream from the valve 11. From this description it will be understood that pressure in the upper portion of the leg 23 of the manometer tube 21 reflects pressure upstream from the valve 11 while pressure in the upper portion of the leg 22 reflects pressure downstream from the valve 11.

Figure 2:
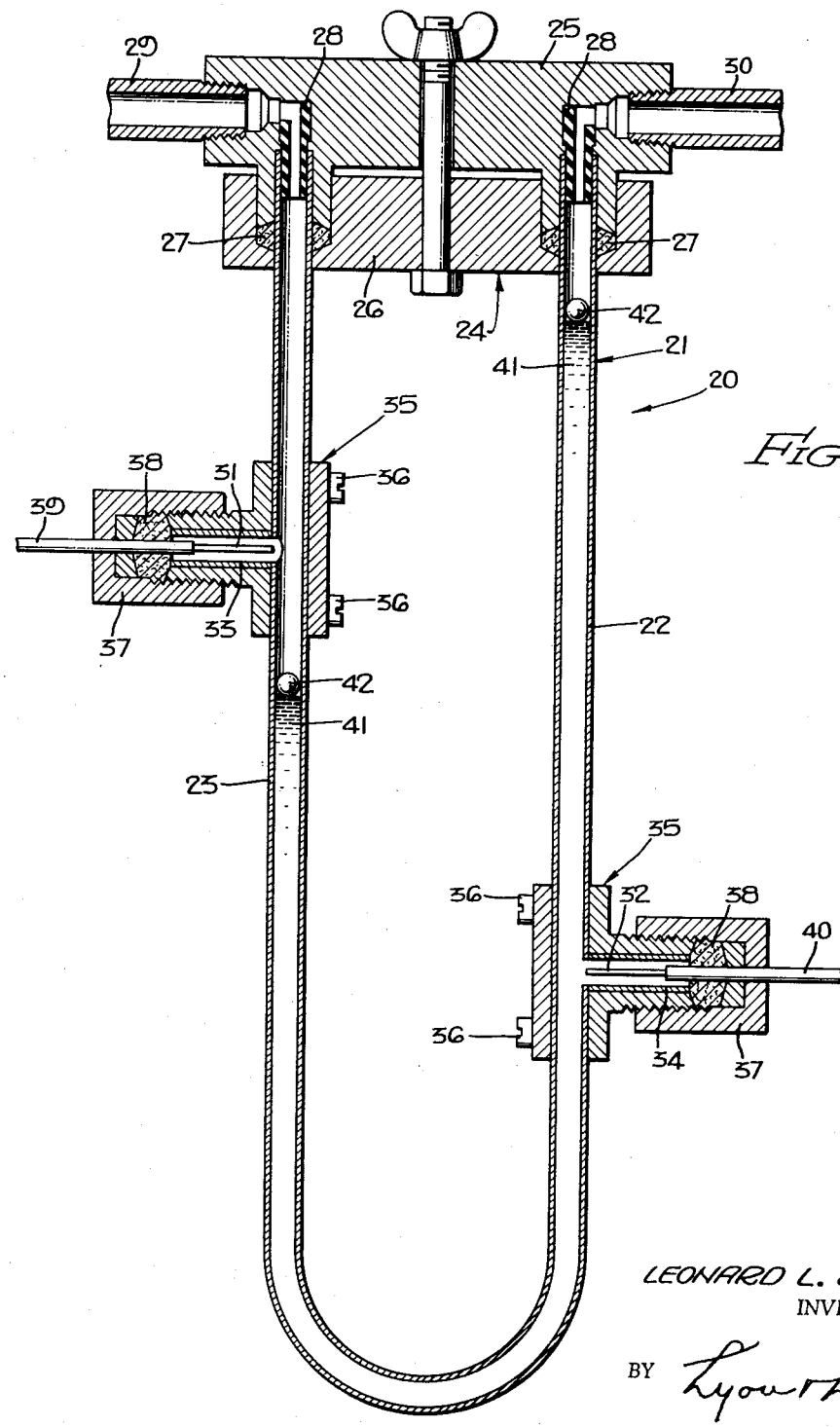
Figure 2 is a sectional elevation on an enlarged scale showing a portion of the apparatus of Figure 1.

A pair of electrical contact elements are provided on the tube 21 and as shown in Figure 2, these elements each comprise an exposed electrode 31, 32 positioned within a lateral branch 33, 34 of the tube 21. The lateral branch 33 on the leg 23 is positioned at a higher elevation than the branch 34. A split body 35 is clamped about each leg of the tube 21 by means of threaded element 36 and the body is centrally bored to receive its respective branch of the tube. A gland 37 is threaded to the outer projecting portion of each of the bodies 35 and contains suitable packing material 38 to prevent leakage of mercury. An insulated electrical wire 39 extends through the gland and packing and carries the electrode 31. Similarly, an insulated electrical wire 40 extends into the gland and packing and is connected to the electrode 32. A column of mercury 41 in the tube 21 normally submerges the electrode 32 in the branch 34.

In order to prevent loss of mercury under abnormally high pressures in either the supply conduit 16 or consumers conduit 17, I place a small rubber ball 42 in each leg of the manometer tube 21 and this rubber ball floats on the mercury. Should the mercury rise to an abnormally high level in either one of the legs 22 or 23, the ball 42 seats against the lower end of the resilient element 28 to prevent leakage.

The electrical wire 40 is connected to a battery 44, or other source of electrical energy, and the battery in turn, is connected by wire 45 to the relay 46. The wire 39 is connected to a suitable alarm 47, which may be either visible or audible. The alarm is connected in parallel with the relay 46. From this description it will be understood that an electrical circuit is closed whenever the mercury 41 touches both of the electrical contacts 31 and 32, and in this circuit the battery 44 energizes the alarm 47 and the relay 46.

A motor driven cut-off valve 49 may be mounted in the supply conduit 16 and an electrically operated solenoid valve 50 may be mounted in the consumers conduit 17. Electrical lead wires 51 and 52 extend from the relay 46 to both of the valves 49 and 50. The relay 46 is also connected to a source of electrical energy 53. The relay 46 is constructed so that upon closing of the circuit to the contacts 31 and 32, a circuit is closed through the wires 51 and 52 to energize both the motor driven cut-off valve 49 and the solenoid valve 50.

The quantity of mercury 41 and the relative height of the electrical contacts 31 and 32 are chosen so that the contact 31 is above the mercury level in the leg 23 of the manometer tube 21 during normal flow through the check valve 10. During such normal flow from the supply line 16 to the consumers line 17, the valve 11 swings away from the seat 12 under the force of the moving stream of liquid. The weighted valve element, however, does not more completely out of the path of flow of liquid, and hence, a pressure drop occurs through the check valve 10. Under the conditions of normal flow the pressure in chamber 18 is therefore lower than the pressure in the supply line 16 and consequently the pressure in the upper end of the leg 22 of the manometer tube 21 is lower than the pressure in the upper end of the leg 23. The mercury column 41 assumes the position shown in Figure 2 and since the mercury does not touch the contact 31 the alarm circuit is not energized.

If, under no-flow conditions, the pressure in the consumers line 17 should approach within 2 p.s.i. of the pressure within the supply line 16, the valve element 11 closes against the seat 12. If a tight sealing engagement is achieved, no leakage occurs, and the pressure in the chamber 18 does not increase. If leakage, does occur, however, under this 2 p.s.i. differential, the pressure in the chamber 18 increases. The corresponding rise in pressure in the upper end of the leg 22 lowers the mercury level in that leg and causes it to rise in the leg 23 and to submerge the contact 31. This energizes the alarm circuit, signifying that either the check valve 11 is leaking or that backflow conditions are present or imminent.

Closing of the alarm circuit causes the relay 46 to supply power to both the motor driven valve 49 and the solenoid valve 50, causing them both to close. It will be noted that the alarm circuit is energized whenever one of the following conditions exist: (a) when positive pressure exists in the supply line 16 and in the consumers line 17 under no-flow conditions, and when the pressure in the consumers line approaches within 2 p.s.i. of the pressure in the supply line; and (b) when pressure in the supply line 16 falls below pressure in the consumers line 17.

Having fully described my invention, it is to be understood that I do not wish to be limited to the details herein set forth but my invention is of the full scope of the appended claims.

I claim:

1. In a device for connecting a supply conduit to a consumers conduit, the combination of: a check valve operatively interposed between the conduits, the check valve having means establishing a pressure drop from the supply conduit to the consumers conduit under conditions of normal flow therethrough and establishing a certain value of pressure differential at cessation of flow, a differential pressure switch including a mercury U tube manometer, said manometer having a pair of legs and an electrical contact element on each leg, one of the contact elements being positioned at a higher elevation than the other, and piping means connecting the legs of the U tube mercury manometer to reflect pressures in the supply conduit and consumers conduit, respectively, whereby an electrical circuit is closed through said contacts by movement of the mercury whenever the differential pressure between the conduits enters the range between 0 p.s.i. differential and said certain value of pressure differential.

2. The combination set forth in claim 1 in which the higher of the two electrical contact elements is associated with the manometer leg which is connected to the supply conduit.

References Cited in the file of this patent

UNITED STATES PATENTS

| | | |
|---|---|---|
| 490,684 | Schmilling et al. | Jan. 31, 1893 |
| 654,631 | Hays | July 31, 1900 |
| 1,713,833 | Kochendorfer | May 21, 1929 |
| 1,968,648 | Kendall | July 31, 1934 |
| 1,977,498 | Staegemann | Oct. 16, 1934 |
| 2,033,084 | Rowley | Mar. 3, 1936 |
| 2,714,168 | Hencke et al. | July 26, 1955 |
| 2,773,251 | Snyder | Dec. 4, 1956 |